United States Patent Office 3,251,058
Patented May 10, 1966

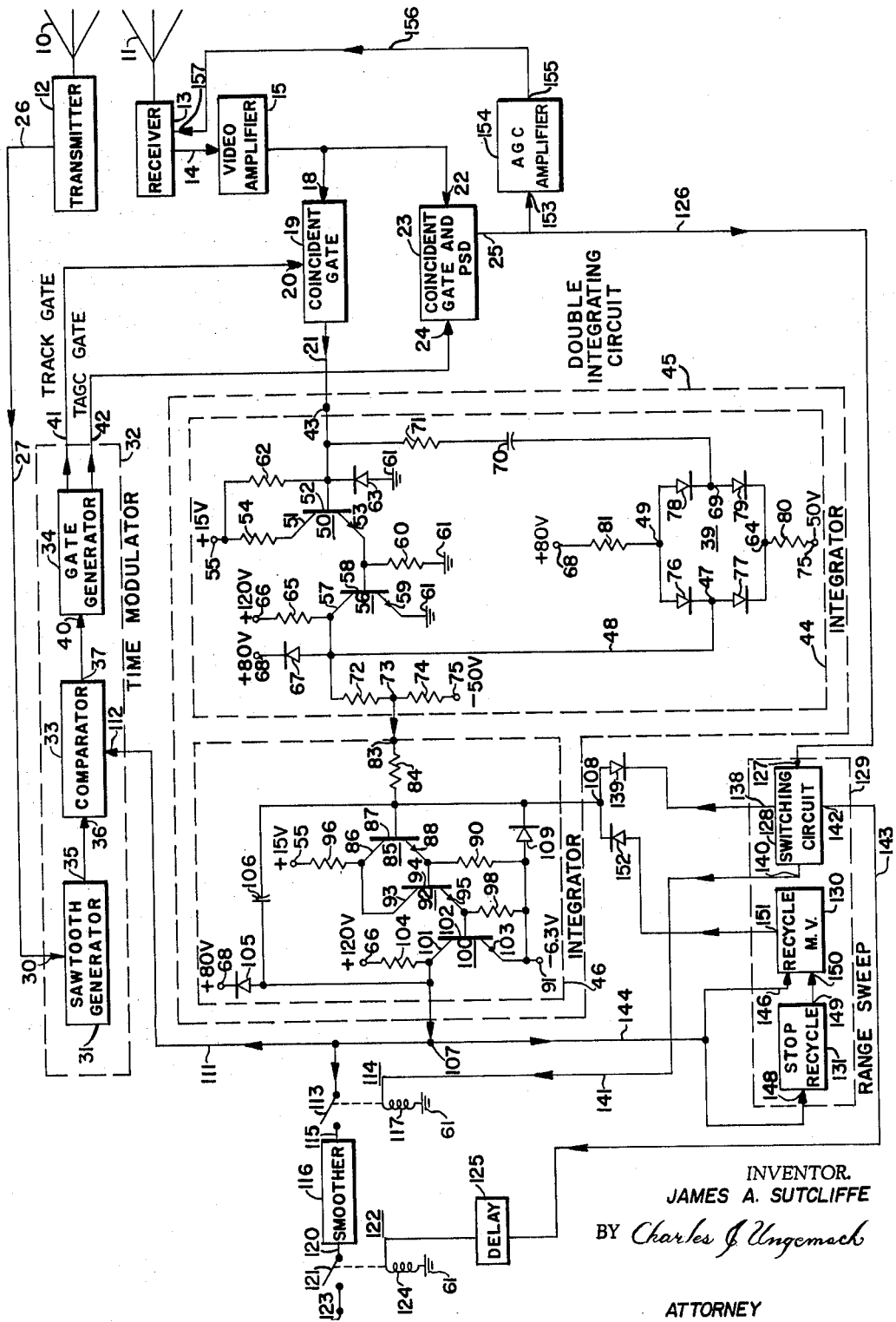

3,251,058
RADAR TRACKING APPARATUS
James A. Sutcliffe, Seattle, Wash., assignor to Honeywell Inc., Minneapolis, Minn., a corporation of Delaware
Filed May 11, 1964, Ser. No. 366,272
8 Claims. (Cl. 343—7.3)

This invention pertains to pulse radar systems utilizing automatic target tracking and more particularly to improvements in the acquisition bandwidth and the initial track rate capability of automatic tracking radar altimeter systems.

With the advent of supersonic aircraft it has become imperative that pulse radar altimeter systems have a broad bandwidth and a high initial track rate capability since the increased climbing rate of the aircraft as well as any rapidly changing characteristics of the earth's surface below the craft produce sudden changes in the target rate. The initial track rate capability is defined as the track rate capability the instant a sudden relatively large change in the target rate is introduced into the radar tracking loop. At the same time it is desirable that the radar tracking loop have a relatively low bandwidth in order to minimize undesired noise effects. However, the low tracking loop bandwidth results in the tracking loop having a relatively low initial track rate capability.

The present invention provides a radar altimeter system which operates with a relatively low bandwidth during normal tracking conditions but which automatically broadens its bandwidth in the event of a sudden change in target rate as a result of a sudden change in aircraft altitude or terrain characteristics.

The invention comprises an automatic tracking loop which includes a sawtooth generator that is energized by a timing pulse generated in synchronism with a transmitted output pulse. The sawtooth generator produces a sawtooth, or ramp, output having a time duration which is a function of range or altitude. The sawtooth signal is applied to a comparator where it is compared with the output of a double integrator.

The double integrator comprises a first, or altitude rate, integrator which has its output connected to the input of a second, or altitude integrator. The output of the altitude integrator is connected to the comparator.

When the output of the double integrator and the instantaneous value of the sawtooth signal are equal a pulse is generated at the output of the comparator which is applied to the input of a gate generator. The gate generator produces two output gates in response to the pulse output of the comparator. The first output gate of the gate generator is called the track gate and the second gate is called the track automatic gain control gate (TAGC). The track gate enables a coincident gate circuit while the TAGC gate enables a coincident gate and peak sensing detector circuit.

When a reflected transmitted pulse, which in the case of a radar altimeter has reflected from the ground below the aircraft, is received by the receiver antenna it is applied to a receiver which produces a video pulse output. This video pulse is amplified and applied to inputs of the coincident gate circuit and the coincident gate and peak sensing detector circuit. The output of the coincident gate circuit is applied to the input of the altitude rate integrator in the double integrating circuit. The output of the coincident gate circuit is a current which is proportional to the area of coincidence between the video pulse and the track gate.

The altitude rate integrator comprises a high gain amplifier having an input and an output and further having a capacitance and resistance connected in series feedback from the output to the input of the amplifier. The altitude rate integrator has a predetermined positive offset current flowing into its input which is exactly cancelled or balanced by a negative current from the output of the coincident gate circuit when the track gate and the video pulse are in the proper degree of coincidence. In one mode of altimeter operation, the tracking mode, the track gate is coincident with the leading edge of the video pulse. During this time the positive offset current into the input of the altitude rate integrator is exactly cancelled by the output of the coincident gate circuit. If the track gate is not tracking enough of the leading edge of the video pulse the output of the coincidence gate circuit is too small and there is a net positive input current into the rate integrator. Similarly, if the track gate is tracking too much of the video pulse the output current of the coincident gate circuit is too large and there is a net negative current into the input of the rate integrator.

If the aircraft's altitude changes suddenly, either because the aircraft is climbing or diving or because of a sudden terrain change such as a canyon or a mountain, the altitude video pulse occurs either earlier or later in time, depending upon whether the altitude has decreased or increased. In either case the track gate must move suddenly in time so as to remain coincident with the video pulse. The rate at which the track gate can move in time is called the track rate capability (TRC) and is equal to $$E_1\left(\frac{K}{T_2}\right)$$

where $E_1$ is the output voltage of the altitude rate integrator, K is the slope of the sawtooth signal and $T_2$ is the time constant of the altitude integrator.

If K, the slope of the sawtooth signal, and $T_2$, the time constant of the altitude integrator, are both constant then it can be seen from the above relationship that the track rate capability is dependent upon the output $E_1$ of the altitude rate integrator, and is a maximum when the output of the altitude rate integrator is a maximum. However, at the initial loss of coincidence between the track gate and the video pulse, the output of the altitude rate integrator does not immediately reach its maximum output but rather there is a time delay caused by the fact that the feedback capacitor must charge. Therefore, the initial output voltage of the rate integrator equals the integrator input current times the magnitude of the integrator feedback resistance. The initial track rate capability is determined by the initial output voltage of the altitude integrator. It is at the instant of initial loss of coincidence between track rate and the video pulse that it in desirable for the altimeter to have its maximum track rate capability.

In the present invention, a current limiting device, such as a diode switching circuit, is placed in the feedback circuit of the altitude rate integrator. The operation of the current limiting device is such that the feedback current is limited to a maximum amount after which the current is forced to flow into the high gain amplifier of the altitude rate integrator, thereby, causing the altitude rate integrator to operate as an amplifier. Since the altitude rate integrator is operating like an amplifier a high input signal produces a high output signal $E_1$, which provides a high initial track rate capability of the tracking loop.

If the aircraft's altitude changes suddenly the amount of conicidence between the track gate and the video return pulse changes and a large variation in the input signal to the altitude rate integrator occurs. This large change in the input signal causes a large current to flow in the feedback circuit of the altitude rate integrator. However, because of the current limiting device only a predetermined maximum amount of current is allowed to flow in the feedback circuit. Once the current, which the large change in the input signal causes to flow, exceeds the maximum allowable current in the feedback circuit the excess current must flow into the high gain amplifier causing the altitude rate integrator to operate as an amplifier and thereby, increasing the bandwidth and the instantaneous track rate capability of the tracking loop. The increased bandwidth enables the tracking loop to respond rapidly and adjust the track gate to coincide with the video return signal. When the proper amount of coincidence is again obtained the altitude rate integrator again operates as an integrating circuit. In this manner the present invention obtains both the benefit of a high initial track rate capability and also a relatively low tracking loop bandwidth during normal tracking operation.

It is one object of this invention to provide an improved pulse radar system utilizing automatic target tracking.

Another object of this invention is to provide an automatic tracking radar altimeter system having an improved acquisition bandwidth and initial track rate capability.

These and other objects of my invention will become apparent to those skilled in the art upon consideration of the accompanying specification, claims, and drawing of which:

The single figure shows a schematic representation of the present invention.

Structure

Referring to the figure there is shown a transmitter antenna 10 and a receiver antenna 11. Transmitter antenna 10 is connected to the output of a transmitter 12, and receiver antenna 11 is connected to the input of a receiver 13. A video output 14 of receiver 13 is connected through a video amplifier 15 to an input 18 of a coincident gate circuit 19 and to an input 22 of a coincident gate and peak sensing detector circuit 23. Coincident gate circuit 19 further has an enabling input 20 and an output 21, while coincident gate and peak sensing detector circuit 23 further has an enabling input 24 and an output 25.

A timing output 26 of transmitter 12 is connected by means of a conductor 27 to an input 30 of a sawtooth generator 31 of a time modulator 32. Time modulator 32 further includes a comparator 33 and a gate generator 34. An output 35 of sawtooth generator 31 is connected to a first input 36 of comparator 33, and an output 37 of comparator 33 is connected to an input 40 of gate generator 34.

A first output 41 of gate generator 34 is connected to the enabling input 20 of coincident gate circuit 19, while a second output 42 of gate generator 34 is connected to the enabling input 24 of coincident gate and peak sensing detector circuit 23. The output 21 of coincident gate circuit 19 is connected to an input 43 of a first integrator 44 of double integrator 45. Double integrator 45 further includes a second integrator 46.

Input 43 of integrator 44 is connected directly to a base 52 of a transistor 50. Transistor 50 further has a collector 51 and an emitter 53. Collector 51 of transistor 50 is connected by means of a resistor 54 to a positive 15 volt potential source 55, while emitter 53 of transistor 50 is connected directly to a base 58 of a transistor 56, and by means of a resistor 60 to ground 61. The base 52 of transistor 50 is connected by means of a resistor 62 to the potential source 55 and by means of a reverse poled diode 63 to ground 61.

Transistor 56 has a collector 57 which is connected by means of a resistor 65 to a positive 120 volt potential source 66, and by means of a diode 67 to a positive 80 volt potential 68. Transistor 56 also has an emitter 59 which is connected directly to ground 61. Collector 57 of transistor 56 is further connected by means of a resistor 72 to an output terminal 73 of integrator 44. Output terminal 73 is connected by means of a resistor 74 to a negative 50 volt potential source 75.

A terminal 47 is also connected by means of a lead 48 to the collector 57 of transistor 56. A diode 76 is connected from the terminal 47 to a terminal 49 in a manner to allow positive current to flow from terminal 49 to terminal 47. A second diode 77 is connected to terminal 47 and to a terminal 64 in a manner to allow positive current to flow from terminal 47 to terminal 64. A diode 78 is connected from terminal 49 to a terminal 69 in a manner to allow positive current to flow from the terminal 49 to the terminal 69. A fourth diode 79 is connected from the terminal 69 to the terminal 64 in a manner to allow positive current to flow from the terminal 69 to the terminal 64. A feedback capacitor 70 and a feedback resistor 71 are connected in a series arrangement from the input 43 of first integrator 44 to the terminal 69. The terminal 64 is connected by means of a resistor 80 to the negative 50 volt potential source 75. The terminal 49 is connected by means of a resistor 81 to the positive 80 volt potential source 68. The four diodes 76, 77, 78 and 79 form a diode switching circuit which is connected in the feedback circuit of the integrator 44 in the manner described above, to limit the maximum amount of current flowing in the feedback circuit.

Output 73 of integrator 44 is connected to an input 83 of integrator 46. Input 83 of integrator 46 is connected by means of a resistor 84 to a base 87 of a transistor 85. Transistor 85 further has a collector 86 and an emitter 88. Emitter 88 of transistor 85 is connected by means of a resistor 90 to a negative 6.3 volt potential source 91, and is further directly connected to a base 94 of a transistor 92. Transistor 92 further has a collector 93 and an emitter 95. Collector 86 of transistor 85 is directly connected to collector 83 of transistor 92, and is further connected by means of a resistor 96 to the positive 15 volt potential source 55.

Emitter 95 of transistor 92 is connected by means of a resistor 98 to the negative 6.3 potential source 91 and is further connected to a base 102 of a transistor 100. Transistor 100 further has a collector 101 and an emitter 103. Emitter 103 of transistor 100 is connected directly to the negative 6.3 potential source 91. Collector 101 of transistor 100 is connected by means of a resistor 104 to the positive 120 volt potential source 66, and by means of a diode 105 to the positive 80 volt potential source 68. Collector 101 further is connected by means of a capacitor 106 to the base 87 of transistor 85, and is further connected to an output terminal 107 of integrator 46. The base 87 of transistor 85 is directly connected to an input terminal 108 of integrator 46 and the negative 6.3 potential source 91 is connected by means of a diode 109 to input terminal 108.

Output 107 of integrator 46 is connected by means of a conductor 111 to a second input 112 of comparator 33. The loop just explained consisting of sawtooth generator 31, comparator 33, gate generator 34, coincident gate 19, first integrator 44 and second integrator 46 is known as the tracking loop and is the tracking circuitry for the present apparatus. Output 107 of integrator 46 is further connected by means of a contact 113 of a relay 114 to an input 115 of a smoother circuit 116. Relay 114 further has a relay winding 117. An output 120 of smoother circuit 116 is connected by means of a relay contact 121 of a relay 122 to an altitude output terminal 123. Relay 122 further has a relay winding 124.

Ouput 25 of coincident gate and peak sensing detector circuit 23 is coupled by means of a conductor 126 to an input 127 of a switching circuit 128 which is part of a range sweep unit 129. Range sweep unit 129 further includes recycle multivibrator 130 and a stop recycle circuit 131. An output 138 of switching circuit 128 is connected by means of a reverse poled diode 139 to the input 108 of integrator 46. An output 140 of switching circuit 128 is connected by means of a conductor 141 to one side of the relay winding 117 of relay 114, the other side is connected to ground 61. An output 142 of switching circuit 128 is connected by means of a conductor 143 to a delay circuit 125. The output of delay circuit 125 is connected to one side of the relay winding 124 of relay 122, the other side is connected to ground 61.

Output 107 of integrator 46 is connected by means of a conductor 144 to an input 146 of recycle multivibrator 130, and by means of conductor 144 to an input 148 of stop recycle circuit 131. An output 149 of stop recycle circuit 131 is connected to an input 150 of recycle multivibrator 130. An output 151 of recycle multivibrator 130 is connected by means of a diode 152 to the input 108 of integrator 46. Output 25 of coincident gate and peak sensing detector circuit 23 is further connected to an input 153 of an automatic gain control circuit and amplifier 154. An output 155 of AGC amplifier 154 is connected by means of a conductor 156 to an input 157 of receiver 13.

Operation

Transmitter 12 generates short pulse width pulses of RF energy which are applied to transmitting antenna 10 and are radiated toward the target, in this case ground. The reflected RF energy pulse is picked up by the receiver antenna 11 and is applied to receiver 13. Receiver 13 produces a vidoe output singal at output 14 which is coupled through the video amplifier 15 to the inputs 18 and 22 of coincident gate circuit 19 and coincident gate and peak sensing detector circuit 23 respectviely. Each time the transmitter produces a pulse a timing pulse appears at transmitter output terminal 26 and is coupled through conductor 27 to the input 30 of sawtooth generator 31. This timing pulse initiates the generation of a sawtooth signal which appears at the output 35 of sawtooth generator 31 and is coupled to the input 36 of comparator 33. The output appearing at terminal 107 of the double integrator 45 is coupled through conductor 111 to the input 112 of comparator 33. When the instantaneous magnitude of the sawtooth applied to comparator 33 is equal to the magnitude of the output of the double integrator 45 a signal appears at output terminal 37 of comparator 33 and is coupled to the input 40 of gate generator 34.

This input to gate generator 34 causes a first and a second gate to appear at the gate generator output terminals 41 and 42, respectively. The first gate output called the track gate, is coupled from output terminal 41 of gate generator 34 to the input terminal 20 of coincident gate circuit 19 and the second gate output, called the track automatic gain control (TAGC) gate appears at output terminal 42 of gate generator 34 and is coupled to the input terminal 24 of coincident gate and peak sensing detector circuit 23. The trailing edge of the TAGC gate appearing at output terminal 42 of gate generator 88 is delayed in time by a predetermined amount with respect to the trailing edge of the track gate appearing at output terminal 41 of gate generator 34. The track gate input to terminal 20 of coincident gate circuit 19 enables the circuit 19 during the leading edge of the video pulse coupled to input 18 of circuit 19, and thereby allows an output signal proportional to the leading edge of the video signal to appear at output terminal 21 of circuit 19. The output signal from the coincident gate circuit 19 is coupled to the input 43 of integrator 44. This signal is integrated in integrator 44 and is coupled from the output 73 of integrator 44 to the input 83 of integrator 46. The signal at the output 73 of integrator 44 is proportional to the rate of change of altitude. As mentioned previously, this signal is coupled to the input 83 of integrator 46 where it is integrated. Since the input to integrator 46 is proportional to the rate of change of altitude the output appearing at output 107 of integrator 46 is proportional to altitude. This signal is coupled through relay contact 113 to the input 115 of smoother circuit 116. The signal is then smoothed in the smoother circuit 116 and appears as a D.C. level at the output 120 of smoother 116. The smoothed altitude signal is coupled through relay contact 121 to the altitude output terminal 123.

As mentioned previously, the altitude signal appearing at output terminal 107 of integrator 46 is also coupled through conductor 111 to input terminal 112 of comparator 33. The magnitude of the altitude signal determines at which point in time an output signal appears at the output of comparator 33 and, hence, the time at which gate generator 34 generates the track gate and the TAGC gate.

The TAGC gate transmitted to the input 24 of coincident gate and peak sensing detector circuit 23, from the output 42 of gate generator 34, enables circuit 23. When the coincident gate and peak sensing detector circuit 23 is enabled the video signal appearing at its input 22 is transmitted through the circuit and an output appears at output terminal 25 which is proportional to the peak amplitude of the video signal.

The output signal at terminal 25 of coincident gate and peak sensing detector circuit 23 is coupled by means of conductor 126 to the input 127 of switching circuit 128 thereby operating switching circuit 128 to its first state. When switching circuit 128 is in its first state an output appears at output terminal 140 and is coupled through conductor 141 to relay winding 117 of relay 114 energizing the winding and thereby closing relay contact 113. An output signal also appears at output 142 of switching circuit 128 and is coupled through conductor 143 and delay circuit 125 to winding 124 of relay 122 thereby energizing relay 122. When relay 122 is energized relay contact 121 is closed. As explained previously, when relay contact 113 is closed the altitude output of the double integrator 45 is connected to the input of smoother circuit 116 and when relay contact 121 is closed the output of smoother circuit 116, or in other words the altitude signal, is connected to the altitude output terminal 123.

Assume now that the track gate and the TAGC gate from the output of the gate generator lose track of the video pulse. In other words, assume that the track gate appearing at input 20 of coincident gate circuit 19 is not coincident with the video pulse applied to input 18 of coincident gate circuit 19, and similarly, the TAGC gate applied at input 24 of the coincident gate and peak sensing detector circuit 23 is not coincident with the video pulse applied to input 22 of circuit 23. In this situation there is no output from either coincident gate circuit 19 or coincident gate and peak sensing detector circuit 23 and, hence, it becomes necessary for the altimeter to switch over to a search mode so as to re-establish coincidence between the tracking gates and the video pulse.

The searching operation is accomplished as follows: when coincidence between the TAGC gate and the video pulse is lost or when the output from the coincident gate and peak sensing deetctor circuit 23 drops below a predetermined value, the input of switching circuit 128 is insufficient to maintain switching circuit 128 in its first operating state and hence it switches to its second operating state.

When switching circuit 128 is in its second mode of operation a substantially step function signal appears at output terminal 138 of switching circuit 123 and is coupled through diode 139 to the input 108 of the second integrator 46. This substantially step function input signal to integrator 46 is integrated and sweeps the output signal of integrator 46 to its positive limit. The output 107 of integrator 46 is coupled through conductor 144 to the input 146 of recycle multivibrator 130. When the output signal of integrator 46 reaches its positive limit, recycle multivibrator 130 changes state and a substantially step function output signal appears at recycle multivibrator output 151. This signal is coupled through diode 152 to the input 108 of integrator 46. This substantially step function signal is of an opposite polarity to the step function output signal of switching circuit 128, and hence this signal is integrated in integrator 46 and sweeps the output signal of integrator 46 to its negative limit. The output 107 of integrator 46 is connected by means of conductor 144 to the input 148 of the stop recycle 131. As the output signal of integrator 46 reaches its negative limit a signal appears at output 149 of stop recycle circuit 131 and is coupled to input 150 of recycle multivibrator 130 thereby resetting recycle multivibrator 130. When recycle multivibrator 130 is reset the step function output signal disappears from recycle multivibrator output 151 and the step function output signal from switching circuit 128 again controls the operation of integrator 46 and tends to sweep the output signal of the integrator to its positive limit once more.

At the output signal of double integrator 45 sweeps over its range from the negative limit to the positive limit, the point at which the instantaneous magnitude of the sawtooth wave form applied to input 36 of comparator 33 equals the magnitude of the output signal of double integrator 45 applied to input 112 of comparator 33 varies, and hence the time at which the output signal appears on output terminal 37 of comparator 33 also varies. Since the output signal of comparator 33 controls the time at which the gate generator 34 generates the track gate and the TAGC gate the times of these gates also vary and these gates are effectively swept continuously up and back through substantially the limit of the altimeter range. At some point during the searching operation the track gate and the TAGC gate will intercept the video pulse from the output of video amplifier 15. At this time the track gate applied to terminal 20 of coincident gate circuit 19 is coincident with the video pulse supplied to input 18 of coincident gate circuit 19 and, hence, an output signal appears at output terminal 21. Similarly, the TAGC gate applied to terminal 24 of the coincident gate and peak sensing detector circuit 23 is coincident with the video pulse supplied to input terminal 22 and, hence, an output signal once again appears at output terminal 25. As explained previously, the output signal on terminal 25 of coincident gate and peak sensing detector circuit 23 switches switching circuit 128 to its first mode of operation and the altimeter returns to the track mode.

When the altimeter changes from its track mode of operation to its search mode of operation, and switching circuit 128 changes from its first mode to its second mode of operation, the output signal at output terminal 140 of switching circuit 128, which energizes relay winding 117 of relay 114, is not immediately removed but rather there is a short time delay before relay winding 117 is de-energized. The purpose of this short time delay is to prevent the smoother from being disconnected from the output 107 of the double integrator 45 in the event that there is a momentary loss of coincidence between the track gate and the video signal and the TAGC gate. Similarly, when switching circuit 128 changes from its first mode of operation to its second mode of operation and the output signal at output terminal 142 of switching circuit 128 disappears, delay circuit 125 prevents the immediate de-energization of relay winding 124 of relay 122. The delay of delay circuit 125 which inhibits the de-energization of relay winding 124 is substantially longer than the delay in switching circuit 128 which inhibits the de-energization of relay winding 117.

Smoother circuit 116 contains a memory, and hence this circuit remembers the aircraft's altitude at the moment that relay winding 117 is de-energized and relay contact 113 is opened thereby disconnecting smoother circuit 116 from the output of the double range integrator 45. If the searching circuits are unable to re-establish coincidence between the video signal and the track gate and the TAGC gate during the delay time of delay circuit 125 then relay winding 124 is de-energized and relay contact 121 opens; thereby removing the altitude signal from the altitude output terminal. As soon as coincidence is re-established between the video signal and the track gate and the TAGC gate, relay windings 117 and 124 are again energized and the altitude indicator indicates the present altitude.

When the altimeter is in its track mode of operation the track gate and the TAGC gate, produced by the gate generator 34 and applied to the coincident gate circuit 19 and the coincident gate and peak sensing detector circuit 23, respectively must track, or follow, the video pulse produced by the video amplifier 15. If a sudden change in the time of return of the video pulse should occur, due to a sudden change in the altitude, there must be a rapid change in the time of generation of the track gate and the TAGC gate to retain coincidence between these gates and the video pulse in the coincident gate circuit 19 and the coincident gate and peak sensing detector circuit 23. If the time of generation of the track gate and TAGC gate cannot be changed rapidly enough to maintain coincidence between these gates and the video pulse the coincident gate circuit 19 and the coincident gate and peak sensing detector circuit 23 lose coincidence and the switching circuit 128 switches to the search mode because of a lack of signal at the input 127.

The time required for the track loop to generate the track gate and the TAGC gate is directly dependent upon the bandwidth of the tracking loop. The bandwidth of the tracking loop is maintained relatively narrow during normal operation to reduce the effect of noise in the system. Because the bandwidth of the tracking loop is normally narrow the tracking loop does not have the ability to change its tracking rate suddenly. That is, when the rate of the video pulse suddenly changes the initial coincidence between the track and the TAGC gate and the video pulse may be lost. Thus, so that the system is not continually switching from the track mode to the search mode the present invention increases the initial track rate capability.

The track rate capability is equal to $$E_1\left(\frac{K}{T_2}\right)$$

where $E_1$ is the output signal of the altitude rate integrator 44 at the output 73, K is the slope of the sawtooth signal produced at the output 35 of the sawtooth generator 31 and $T_2$ is the time constant of the altitude integrator 46.

Both K and $T_2$ are held constant in the present circuitry while $E_1$ is increased to increase the track rate capability.

To illustrate the manner in which the present circuitry causes the output of the altitude rate integrator 44, $E_1$, to increase when the rate of the video pulse is suddenly changed three different relationships between the video pulse and the track gate will be utilized. Assume that the time of return of the video pulse is not changing, or is changing at a relatively slow rate and the track gate is coincident with the leading edge of the video return pulse in the coincident gate circuit 19. A current, which is representative of the area of the track gate coincident with the video return pulse, is applied to the input 43 of the altitude rate integrator 44. This current flowing into the terminal 43 is a negative current and when the proper amount of coincidence between the track gate and the video pulse is maintained exactly nullifies a current which flows from the positive 15 volt source 55 through the resistor 62. Thus, the input current to the altitude rate integrator 44 is zero or substantially zero and the output is zero or substantially zero.

Now assume that the return time of the video pulse suddenly increases. The amount of coincidence between the track gate and the video pulse in the coincident gate circuit decreases and the current flowing into the input 43 of the altitude rate integrator 44 is smaller. This smaller input current does not completely offset the current flowing from the positive 15 volt source 55. Thus, a current flows from the positive 15 volt source 55 through the resistor 62, from the base 52 to the emitter 53 of transistor 50, from the base 58 to the emitter 59 of the transistor 56, and from the emitter 59 to ground 61. This current flowing in the transistor circuitry causes the output of the altitude rate integrator 44 to begin to go negative. As the output of the integrator 44 or the collector 57 of transistor 56 begins to go negative a feedback current begins to flow in the lead 48 to the junction point 47.

In a normal integrator the feedback current flows into the feedback capacitor 70, unhindered, and the output voltage of the integrator increases slowly as the capacitor 70 is charged by the feedback current. However, since the capacitor 70 takes a definite period of time to charge to its maximum value, the output voltage of the integrator will not reach its maximum value for a definite time and the track gate may have lost complete coincidence with the video pulse in the coincident gate 19 during this period of time.

In the present apparatus a current limiting device is placed in the feedback circuit to limit the maximum amount of feedback current which may flow. In this embodiment of the present apparatus the current limiting device is illustrated by the diodes 76, 77, 78 and 79 and their associated circuitry. This circuitry operates in the following manner. The maximum amount of current that is to be allowed to flow in the feedback circuit is determined. The value of the resistors 81 and 80 are chosen so that a current having a value equal to the maximum feedback current desired normally flows from the positive 80 volt source 68 through the resistor 81, through the four diodes 76–79, through the resistor 80 and to the negative 50 volt source 75. The four diodes 76–79 are matched so that they each normally carry an equal amount of current.

For purposes of illustrations assume that the current flowing from the positive 80 volt source 68 to the negative 50 volt source 75 is 20 micro-amperes. If a positive 20 micro-ampere current flows into the junction point 47 from lead 48 the diode 76 is back-biased. The diode 77 is forward biased and conducts the 20 micro-amperes of current to the junction point 64. The diode 79 is back-biased and, thus, the 20 micro-ampere input current flows through the resistor 80 to the negative 50 volt source 75. The 20 micro-ampere current which flows from the positive 80 volt source through the resistor 81 cannot flow through the diode 76 since it is back-biased, and thus, it all flows through the diode 78 to the junction point 69 from whence it will flow into the capacitor 70. Thus, with 20 micro-amperes of current flowing into the diode circuitry 20 micro-amperes of current flows out as though there was a direct connection between junction point 47 and junction point 69.

The circuitry described for this particular example operates in a similar fashion for any current from a minus 20 micro-amperes to a plus 20 micro-amperes. However, if a positive current of 30 micro-amperes is applied at the junction point 47 the diode 76 is back-biased and all of the current flows through the diode 77 and the resistor 80 to the negative 50 volt source 75. The 30 micro-amperes of current flowing through the resistor 80 causes the diode 79 to be back-biased also. The 20 micro-amperes current flowing from the positive 80 volt source 68 through the resistor 81 is conducted by the diode 78 to the capacitor 70. However, it should be noted that even though 30 micro-amperes of current was applied at the junction point 47 only 20 micro-amperes of current flows from the junction point 69 to the capacitor 70. Thus, the feedback current has been limited to the desired maximum value.

If, in the preceding example, the amount of coincidence between the track gate and the video return pulse is relatively small, a small current flows into the integrator 44 and a relatively large current flows from the positive 15 volt source 55 through the resistor 62 and into the transistors 50 and 56. This relatively large current causes the transistors to begin to conduct and a relatively large feedback current flows in the lead 48. Assuming this relatively large feedback current is greater than the maximum desired feedback current the current limiting device 39 provides only the maximum desirable feedback current to the capacitor 70.

Since the amount of negative feedback from the output to the input of the altitude rate integrator 44 is limited to a maximum desirable value the current applied to the base 52 of the transistor 50 is not offset by a feedback current of equal size and there is an excess current available at the input of the operational amplifier portion of the integrator 44, consisting of transistors 50 and 56 and their associated circuitry.

Since transistors 50 and 56 and their associated circuitry are operating as a high gain amplifier and some current is actually flowing into the base 52 of transistor 50 the amplifier goes almost immediately into saturation and the output voltage attains its maximum negative value. This output voltage is $E_1$ and since it becomes a maximum immediately upon the track gate and the video pulse deviating a preselected amount from the desired amount of coincidence, the track rate capability becomes a maximum immediately at this time and the track gate position can be changed rapidly to regain the proper coincidence with the video pulse.

If a greater quantity of the track gate becomes coincident with the video pulse, due to a sudden decrease in time of return of the video pulse, a larger negative current flows into the input 43 of the altitude rate integrator 44. This larger input current exceeds the current which tends to flow from the positive 15 volt source 55 through resistor 62 and results in an excess current which causes the output of the integrator 44 to change in such a direction that this excess will be supplied through the resistor 71 and capacitor 70 from the current limiting device 39. As long as this excess input current is less than the desired maximum feedback current the current limiting device 39 operates as though it is a short circuit between the junction point 69 and the junction point 47. However, as soon as the excess input current exceeds the desirable maximum feedback current the operational amplifier consisting of transistors 50 and 56 is driven to cutoff and the output voltage at 73 immediately attains its maximum positive value corresponding to the maximum inbound track rate capability. Since the track rate capability is at a maximum the track gate recedes from a point within the video pulse and the proper amount of coincidence will again be maintained.

Thus, in the present invention when the time of return of the video pulse is suddenly changed the track rate capability of the tracking loop is automatically increased, immediately upon the amount of coincidence between the track gate and the video pulse changing a given amount. Because of this automatic and immediate increase in the track rate capability of the tracking loop, coincidence between the track gate and the video pulse is not completely lost, and thus, the radar altimeter does not have to go into the search mode of operation. As soon as the track gate attains the correct coincidence with the video amplifier the input current to the altitude rate integrator 44 is decreased and the current limiting device 39 is effectively removed from the circuit, since it no longer limits the current.

While I have shown and described a specific embodiment of this invention, the invention should not be limited to the particular form shown and I intend in the appended claims to cover all modifications which do not depart from the spirit and scope of this invention.

I claim:
1. A distance measuring device comprising:
   a track loop for tracking targets, said track loop having a relatively narrow bandwidth, and including an integrator; and
   means connected to said integrator for instantaneously increasing the output to a maximum, thereby broadening the bandwidth, upon the application to said integrator of an input signal having at least a predetermined value.

2. A distance measuring device comprising:
a track loop for tracking targets, said track loop having a relatively narrow bandwidth, and including a rate integrator, comprising in combination
   (a) a high gain amplifier having an input and an output,
   (b) means for conducting only a limited amount of current,
   (c) impedance means, and
   (d) means connecting said conducting means and said impedance means to said amplifier, providing a feedback path from the output to the input of said amplifier, said conducting means limiting the amount of feedback current during a relatively large change in the input signals to said amplifier, causing said rate integrator to momentarily operate as an amplifier and thereby broadening the bandwidth of said track loop; and
output means connected to said track loop.

3. A radar altimeter comprising:
a track loop for tracking targets, said track loop having a relatively narrow bandwidth, and including a rate integrator, comprising in combination
   (a) a high gain amplifier having an input and an output,
   (b) a diode switching circuit capable of conducting only a limited amount of current,
   (c) impedance means, and
   (d) means connecting said diode switching circuit and said impedance means to said amplifier, providing a feedback path from the output to the input of said amplifier, said diode switching circuit limiting the amount of feedback current during a relatively large change in the input signal to said amplifier causing said rate integrator to momentarily operate as an amplifier and thereby broadening the bandwidth of said track loop; and
output means connected to said track loop.

4. A distance measuring device comprising:
a track loop having narrow bandwidth and comprising, in combination
   (a) time modulator means responsive to a first signal and operable so as to produce a gate output a known time after the occurrence of said first signal,
   (b) coincident gate means connected so as to receive a second signal,
   (c) means connecting the gate output from said time modulator means to said coincident gate means whereby said coincident gate means produces an output signal,
   (d) first and second integrating means connected in series to receive the output signal from said coincident gate means and provide an output at said second integrating means, and
   (e) means connecting said output from said second integrating means to said time modulator means to control the position of said gate whereby said gate is repositioned to follow any changes in the time between the occurrence of said first signal and said second signal; and
means connected to said first integrating means for causing said first integrating means to momentarily operate as an amplifier during a relatively large change in the input signals to said first integrating means and thereby broadening the bandwidth of said track loop.

5. A distance measuring device comprising:
a track loop having a low initial track rate capability and comprising in combination
   (a) time modulator means responsive to a first signal and operable so as to produce a gate output a known time after the occurrence of said first signal,
   (b) coincident gate means connected so as to receive a second signal,
   (c) means connecting the gate output from said time modulator means to said coincident gate means whereby said coincident gate means produces an output signal,
   (d) first integrating means connected to receive the output signal from said coincident gate means and provide an output signal,
   (e) second integrating means connected to receive the output signal from said first integrating means and provide an output signal, and
   (f) means connecting said output signal from said second integrating means to said time modulator means to control the position of said gate whereby said gate is repositioned to follow any changes in the time between the occurrence of said first signal and said second signal; and
a diode switching circuit capable of conducting only a limited amount of current, connected to said first integrating means for causing said first integrating means to momentarily operate as an amplifier during relatively large input signals to said first integrating means, and thereby increasing the initial track rate capability of said track loop.

6. A distance measuring device comprising:
a track loop having a low initial track rate capability and comprising in combination
   (a) time modulator means responsive to a first signal and operable so as to produce a gate output a known time after the occurrence of said first signal,
   (b) coincident gate means connected so as to receive a second signal,
   (c) means connecting the gate output from said time modulator means to said coincident gate means whereby said coincident gate means produces an output signal,
   (d) first integrating means, connected to receive the output signal from said coincident gate means, comprising a high gain amplifier having an output and an input, and a resistor and a capacitor connected to said amplifier to provide a series feedback loop from said output to said input of said amplifier,
   (e) second integrating means connected to the output of said first integrating means and having an output signal representative of the output signal from said coincident gate means doubly integrated, and
   (f) means connecting said output signal from said second integrating means to said time modulator means to control the position of said gate whereby said gate is repositioned to follow any changes in the time between the occurrence of said first signal and said second signal; and
means for conducting only a limited amount of current, connected in said feedback loop of said first integrating means for causing said first integrating means to momentarily operate as an amplifier during a relatively large change in the input signals to said first integrating means and thereby increasing the initial track rate capability of said track loop.

7. A distance measuring device comprising:
a track loop having a relatively narrow bandwidth and comprising in combination
   (a) time modulator means responsive to a first signal and operable so as to produce a gate output a known time after the occurrence of said first signal, (b) coincident gate means connected so as to receive a second signal, (c) means connecting the gate output from said time modulator means to said coincident gate means whereby said coincident gate means produces an output signal, (d) first integrating means, connected to receive the output signal from said coincident gate means, comprising a high gain amplifier having an output and an input, and a resistor and a capacitor connected to said amplifier to provide a series feedback loop from the output to the input of said amplifier, (e) second integrating means connected to the output of said first integrating means and having an output signal representative of the output signal from said coincident gate means doubly integrated, and (f) means connecting said output signal from said second integrating means to said time modulator means to control the position of said gate whereby said gate is repositioned to follow any changes in the time between the occurrence of said first signal and said second signal; and a diode switching circuit capable of conducting only a limited amount of current, connected in said feedback loop of said first integrating means for causing said first integrating means to momentarily operate as an amplifier during a relatively large change in the input signal to said first integrating means, thereby broadening the bandwidth of said track loop.

8. An altimeter comprising:

transmitter means for transmitting a radio frequency energy pulse to a reflecting object;

receiver means for receiving said energy pulse after said pulse has reflected from said object, said receiver means including means for amplifying the reflected pulse and producing a video output pulse;

a track loop having a narrow bandwidth and comprising in combination (a) sawtooth generating means energized in synchronism with the output of said transmitter means, (b) comparator means, (c) means connecting the output of said sawtooth generating means to said comparator means, (d) first integrating means comprising a high gain amplifier having an input and an output and a resistance and capacitance connected to said amplifier to provide a series feedback circuit from said output to said input of said amplifier, (e) second integrating means connected to the output of said first integrating means and having an output indicative of the second integration of the input signal applied to said first integrating means, (f) means connecting the output of said second integrating means to said comparator means, (g) gate generating means, (h) means connecting the output of said comparator means to said gate generating means, (i) coincident gate means, (j) means connecting said coincident gate means to the receiver video pulse output, said coincident gate means further having an enabling input, (k) means connecting the output of said gate generating means to said enabling input of said coincident gate means so as to enable said coincident gate means during the receiver video pulse output, and (l) means connecting the output of said coincident gate means to the input of said first integrating means; and a diode switching circuit capable of conducting only a limited amount of current, connected in the feedback circuit of said first integrating means for limiting the amount of feedback curent during a relatively large change in the input signal to said first integrating means, thereby broadening the bandwidth of said track loop.

No references cited.

CHESTER L. JUSTUS, *Primary Examiner.*

T. H. TUBBESING, *Assistant Examiner.*